United States Patent [19]

Bones et al.

[11] Patent Number: 4,772,449
[45] Date of Patent: Sep. 20, 1988

[54] METHOD OF MAKING A TRANSITION METAL ELECTRODE

[75] Inventors: Roger J. Bones, Abingdon; David A. Teagle; Stephen D. Brooker, both of Swindon, all of England

[73] Assignee: Lilliwyte Societe Anonyme, Luxembourg

[21] Appl. No.: 58,829

[22] Filed: Jun. 5, 1987

[30] Foreign Application Priority Data

Jun. 6, 1986 [GB] United Kingdom ............... 8613799

[51] Int. Cl.⁴ .................................................. B22F 3/00
[52] U.S. Cl. ........................................ 419/2; 419/19; 419/27; 419/45; 427/431; 204/251; 204/292; 204/68; 204/283
[58] Field of Search .............. 427/58, 126.1, 431; 428/307.7; 204/149, 243 R, 250, 251, 292, 68 C, 68 U, 64 RR, 283 S, 283 O, 284 R, 284 Y; 29/623.5; 429/103, 221; 419/27, 19, 45, 54, 2

[56] References Cited

U.S. PATENT DOCUMENTS

| | | | |
|---|---|---|---|
| 3,345,212 | 10/1967 | Schweitzer | 204/48 |
| 4,236,927 | 12/1980 | Buhl et al. | 429/221 |
| 4,356,101 | 10/1982 | Jackovitz et al. | 429/221 |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,592,969 | 6/1986 | Coetzer et al. | 429/103 |
| 4,626,483 | 12/1986 | Bones et al. | 429/103 |
| 4,722,875 | 2/1988 | Wright | 429/103 |

OTHER PUBLICATIONS

Article by Vassie, P. R. and Tseung, A. C. C. entitled High Performance Rechargeable Sintered Iron Electrodes-I: The Effect of Preparative Methods and Additives on the Structure of Sintered Iron Electrodes.

Primary Examiner—John F. Niebling
Assistant Examiner—Kathryn Gorges
Attorney, Agent, or Firm—Arnold, White & Durkee

[57] ABSTRACT

A method of making a cathode suitable for an electrochemical cell of the type having a molten sodium anode, a beta"-alumina separator, and a cathode which comprises one or more transition metals selected from the group comprising Fe, Ni, Co, Cr and Mn. The method comprises heating a particulate starting material comprising at least one member of the group of transition metals in an oxidizing atmosphere to cause its particles to become at least partially oxidized, and to adhere together to form a unitary porous matrix. This matrix is then heated in a reducing atmosphere at least partially to reduce the oxide formed during the formation of the matrix, and the reduced matrix is then impregnated with a sodium aluminium chloride molten salt electrolyte. Sodium chloride in dispersed form is incorporated into the matrix, preferably by mixing sodium chloride in particulate form with the particulate transition metal starting material, before the heating in an oxidizing atmosphere to form the matrix.

8 Claims, 3 Drawing Sheets

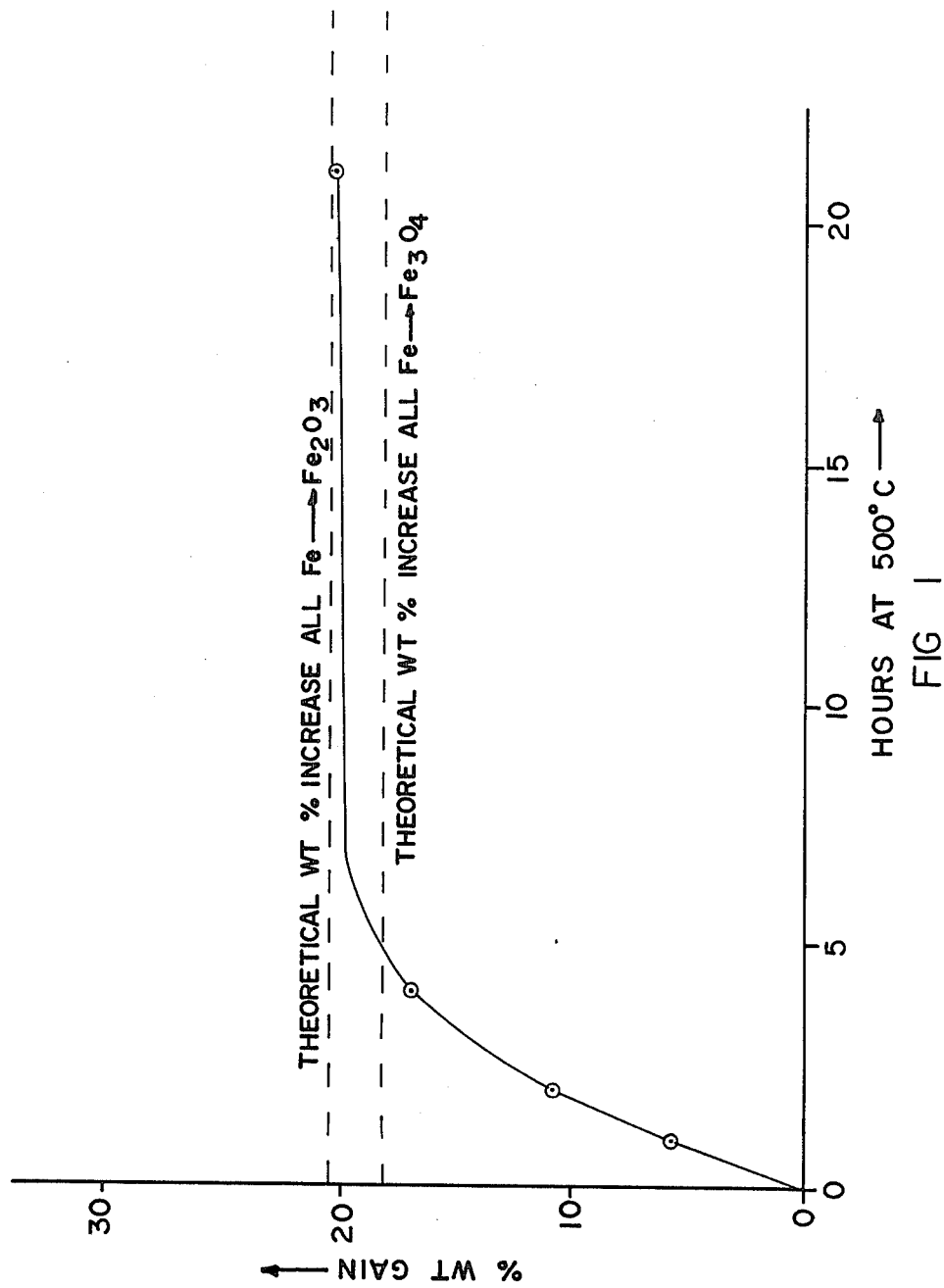

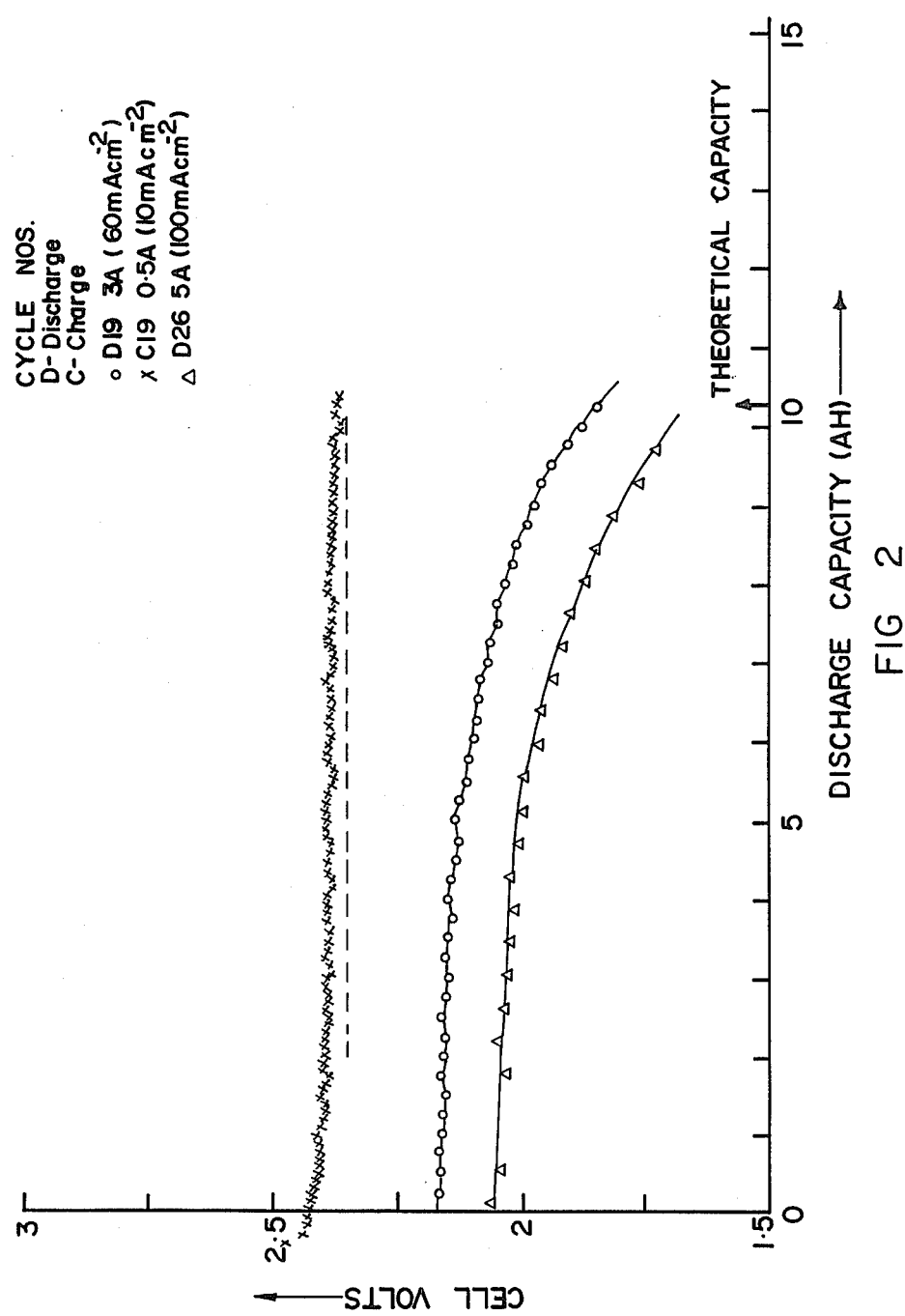

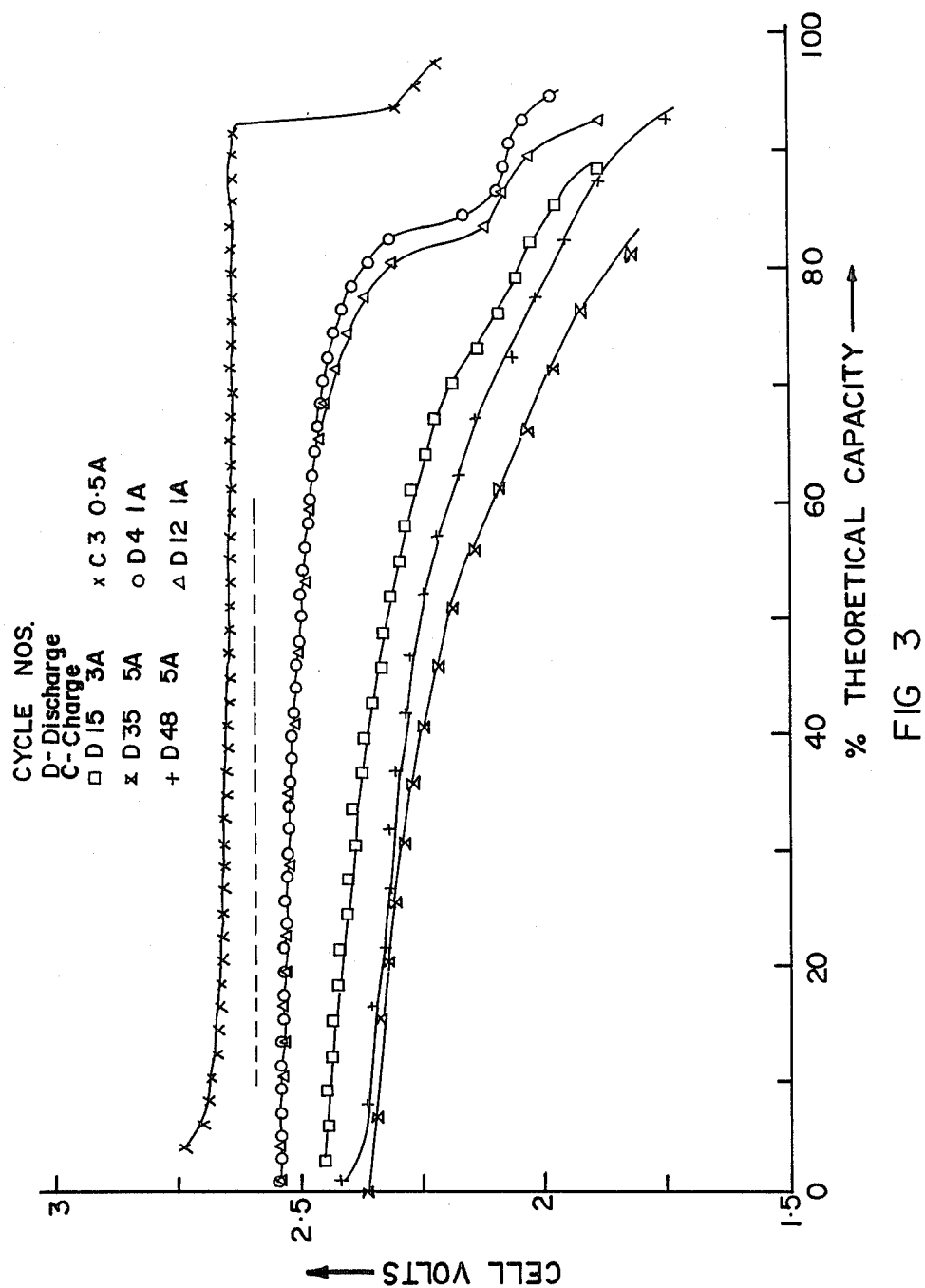

METHOD OF MAKING A TRANSITION METAL ELECTRODE

THIS INVENTION relates to a method of making a cathode for an electrochemical cell, and to such cathode when made according to the method.

According to the invention, in the making of a cathode suitable for an electrochemical cell of the type comprising a sodium anode which is molten at the operating temperature of the cell, a sodium aluminium halide molten salt electrolyte which is also molten at the operating temperature of the cell, a cathode which is in the form of an electronically conductive electrolyte-permeable matrix impregnated with said molten salt electrolyte, and between the anode and the electrolyte and separating said anode from said electrolyte, a separator selected from the group comprising solid conductors of sodium ions and micromolecular sieves which contain sodium sorbed therein, the molten salt electrolyte in the fully charged state of the cell comprising an equimolar mixture of sodium halide and aluminium halide, there is provided the method comprising:

heating a particulate starting material comprising at least one member selected from the group of transition metals comprising Fe, Ni, Co, Cr and Mn in an oxidising atmosphere to cause its particles to become at least partially oxidized and to adhere together to form a unitary porous matrix;

heating the oxidized matrix in a reducing atmosphere at least partially to reduce the oxide formed during the formation of the matrix; and impregnating the reduced matrix with a sodium aluminium halide molten salt electrolyte, sodium chloride in dispersed form being incorporated into the matrix.

Once the matrix has been reduced, and the electrolyte has been impregnated therein and the sodium chloride has been incorporated therein, it is in the form of a discharged cathode ready for immediate use in an electrochemical cell coupled via a suitable electrolyte such as a sodium aluminium halide molten salt electrolyte, and via a suitable separator, with a suitable anode.

The formation of the matrix and incorporation of the sodium chloride into the matrix may take place simultaneously, the method including the step of dispersing particulate sodium chloride in the particulate starting material which is heated to form the matrix, before the matrix is formed by said heating in an oxidizing atmosphere. Some of the sodium chloride is preferably finely divided. Thus, in a particular embodiment of the method, the particulate starting material may have particles which fall within the particle size range 10–100 microns, the particles of the sodium chloride being present in two particle size fractions, namely a size fraction forming 20–40% by mass of the sodium chloride which comprises particles in the particle size range 5–10 microns, and a fraction forming 60–80% by mass of sodium chloride which comprises particles in the particle size range 50–250 microns. Naturally, the sodium chloride may be incorporated into the matrix in other ways. Thus, the sodium chloride may be incorporated into the matrix by immersing the matrix after reduction thereof in an aqueous sodium chloride solution, followed by drying; or the sodium chloride may be incorporated into the matrix by melting the electrolyte and suspending particulate sodium chloride in finely divided form in the molten electrolyte prior to impregnating the electrolyte into the matrix, and then impregnating the electrolyte together with the sodium chloride suspended therein, into the matrix. It is apparent from the aforegoing that the sodium chloride may be incorporated into the matrix in any one of a number of suitable different ways, and it may even be incorporated into the matrix simply by impregnating molten sodium chloride into the matrix, for example by capillary action and wicking. When the sodium chloride is introduced by immersion, this may be by a repetitive process of successive immersions in an aqueous sodium chloride solution, followed by successive dryings in a vacuum oven.

It is however preferred to disperse, as mentioned above, sodium chloride in finely divided form in the particulate material from which the matrix is formed, prior to formation of the matrix. The employment of finely divided sodium chloride promotes even dispersion of the sodium chloride throughout the internal pores, cavities or channels of the matrix, which is desirable in the eventual cathode, and for this reason the matrix should preferably never be heated above the melting point of sodium chloride, ie never above about 790° C. at atmospheric pressure, as this can cause formation of globules of molten sodium chloride in the matrix, adversely affecting the even dispersion thereof in the matrix. The oxidizing and reduction will thus both preferably take place at temperatures below 790° C.

The oxidation to form the matrix will typically take place at a temperature above 250° C. and for a period, inversely related to the temperature, sufficient to form an adequately oxidized, strong, porous, unitary matrix. Thus, the heating in an oxidizing atmosphere to form the matrix may be in air, being to a temperature in the range 450°–550° C. Heating will usually be continued for a period, as evidenced by a mass gain of the heated material, sufficient to oxidize the material which forms the matrix to a desired or predetermined degree, which may typically be as close as practicable to 100% theoretical oxidation. In practice the heating will be continued until the rate of weight gain arising from oxidation becomes unacceptably slow.

The heating in a reducing atmosphere may be in carbon monoxide or preferably hydrogen, being to a temperature in the range 750°–790° C. As mentioned above, the melting point of sodium chloride is about 790° C., and ideally the heating in the reducing atmosphere should be as close as practicable to said melting point, but without melting the sodium chloride, ie slightly below 790° C., with an adequate safety margin. The heating to cause reduction will similarly be continued for a period, as evidenced by a mass loss of the heated material, sufficient to reduce the oxidized material to a predetermined or desired degree, typically as close as practicable to 100% theoretical reduction thereof. Once again, in practice, this heating will take place until the rate of reduction, as evidenced by the rate of mass loss of the matrix, becomes unacceptably slow.

For reasons of cost and availability, the particulate starting material may comprise at least one member selected from the group comprising Fe and Ni, the molten salt electrolyte being one in which the major molar proportion of the halide ions comprises chloride ions. The applicant has found for such Fe, Ni or Fe/Ni particulate starting materials, that the oxidizing and matrix formation and the subsequent reduction, can take place in the absence of supporting moulds for the starting particulate material, although such moulds may naturally be employed when a matrix in the form of a shaped artifact is desired.

The applicants believe that, during the oxidation which forms the matrix, adhesion between adjacent particles of the matrix starting material arises from intergrowth which takes place between layers of oxide forming on the surfaces of neighbouring particles. Oxide bridges or bonds are thus formed between these particles and, during the subsequent reduction, these bridges remain in the form of metallic links or bonds between the particles.

Another feature of the invention includes the step of, while forming the matrix, causing it to adhere to a current collector. Thus, the heating of the particulate starting material to cause oxidation thereof may take place with said starting material in contact with a metallic current collector, the oxidation of said starting material to form the matrix and the subsequent reduction of the matrix causing the reduced matrix to adhere via a plurality of metallic bonds to the current collector.

Typically, cells for which the cathode of the present invention are used are elongate cylindrical in shape, the cathode being tubular or cylindrical and either being centrally located to extend axially with the anode arranged concentrically outside and surrounding the cathode (so-called inside-cathode cells), or the anode being located centrally to extend axially with the cathode arranged concentrically outside and surrounding the anode (so-called outside-cathode cells), the separator being located in each case concentrically between the anode and cathode. For outside-cathode cells the cathode current collector is conveniently provided by a cylindrical cell housing of suitable material, eg steel and/or nickel (eg when the matrix material is iron- or nickel-based), and for inside-cathode cells the cathode current collector may be a central post or tube, embedded in the matrix and similarly of steel and/or nickel. The method of the invention may thus include locating the cathode current collector in contact with the mass of particles to be heated to form the matrix, optionally supporting the particles so that they form a mass of desired shape, and then successively oxidizing and reducing the collector and particles to form the matrix while causing it to adhere to the current collector.

Particles of the material from which the matrix is formed will be in contact with the surface of the current collector which will simultaneously be oxidized. Intergrowth of oxide layers on the particles and an oxide layer on the current collector will, as mentioned above, take place, resulting, after reduction, in metal bridges or bonds between the current collector and matrix.

As mentioned above, when sodium chloride particles are dispersed in the particulate starting material which is heated to form the matrix, the sodium chloride particles preferably are present in two particles size fractions. In cells of the type in question, at least some of this sodium chloride is consumed on charging, so that the particle size of the sodium chloride particles, when they are incorporated in the particulating starting material from which the matrix is formed, prior to formation of the matrix, essentially defines the porosity of the matrix. It is desirable to provide for both fine and coarse porosity, and this may be done by using sodium chloride particles of different sizes. Various combinations of particle sizes may thus be employed, as desired, for example by means of the particles size fractions mentioned above, a typical example being a mixture of 30% by mass of fine 5-10 micron sodium chloride particles with 70% by mass of coarse 5-250 micron sodium chloride particles.

It is a feature of the invention that relatively coarse transition metal particles can be used in the particulate starting material, and the range of metal particles sizes which can be used is optionally 5-500 microns, preferably the 10-100 micron size range mentioned above.

Impregnating the reduced matrix with the sodium aluminium halide molten salt electrolyte may be by vacuum impregnation with said molten salt electrolyte in molten form.

As mentioned above, the cathode formed in accordance with the present invention will be in its discharged state, and can be assembled directly into an electrochemical cell, once it has been inmpregnated with molten salt electrolyte.

The invention accordingly extends to a cathode for an electrochemical cell, whenever made in accordance with the method described above.

The cathode, as mentioned above, will be used in an electrochemical cell comprising the cathode, together with a compatible anode, the anode and cathode being coupled together by a compatible electrolyte.

In particular, in such electrochemical cell the anode is preferably a sodium anode which is molten at the operating temperature of the cell, the electrolyte of the cell being the same sodium aluminium halide molten salt electrolyte as that with which the cathode matrix is impregnated and being molten at the operating temperature of the cell, there being a separator which is a solid conductor of sodium ions or a micromolecular sieve which contains sodium sorbed therein between the anode and the electrolyte and separating the anode from the electrolyte, and the proportions of sodium ions and aluminium ions in the electrolyte being selected so that the solubility of the active cathode substance in the molten electrolyte is at or near its minimum.

The cell may optionally be subjected to a plurality of charge/discharge cycles to condition the cathode. A small amount of sodium may be provided on the anode side of the separator, when the cathode is loaded in the discharged state, to initiate the first charge cycle.

When a solid conductor isolates the anode from the molten salt electrolyte, this solid conductor may be selected from the group consisting of nasicon and beta alumina. The molten salt electrolyte in turn, as mentioned above, is preferably a sodium aluminium chloride based electrolyte.

With regard to the separator which is a solid ion conductor of sodium ions or micromolecular sieve, any sodium moving from the anode to the electrolyte, or vice versa, has to pass through the internal crystal structure of the solid conductor or through the microporous interior of the micromolecular sieve, as the case may be, sodium passing in atomic form through the interface between the anode and separator and in ionic form through the interface between the separator and electrolyte.

As a molten salt electrolyte, sodium aluminium chloride can, depending on the proportions of sodium and aluminium, have a melting point of the order of 150° C. or less, and, also depending on its composition, the active cathode substance can be virtually insoluble therein, and these features are desirable.

This electrolyte may contain a minor proportion of up to, say, 10% by mass and usually less, of a dopant such as an alkali metal halide other than sodium chloride, by means of which its melting point is reduced.

The dopant may thus comprise an alkali metal fluoride, but the proportions of the constituents of the electrolyte should be selected such that the solubility of the active cathode substance in the electrolyte is kept to a minimum.

As mentioned above, the cathode of the present invention is suitable for use for a cell in which the molten salt electrolyte in the fully charged state of the cell comprises an equimolar mixture of sodium halide and aluminium halide. In this regard the applicant has found that the minimum solubility of the active cathode substances of such cells in the sodium aluminium halide electrolytes, which may be doped sodium aluminium chloride electrolytes as described above, occurs when the molar ratio of the alkali metal halide to the aluminium halide is about 1:1. In other words, the relative quantities of said alkali metal ions, aluminium ions and halide ions should conform substantially with the stoichiometric product:

$$M\ Al\ X_4$$

wherein

M represents alkali metal cations; and

X represents halide anions. Such electrolytes are among those described in U.S. Pat. No. 4,287,271.

In this way, the proportions of the constituents can be selected so that the melting point of the electrolyte at atmospheric pressure is below 140° C. Minor proportions of dopants may be tolerated in the electrolyte, e.g. substances such as sulphur or substances such as fluorides which will ionize in the molten electrolyte to provide ions which affect the electrolytic action of the electrolyte or, as mentioned above, substances which reduce its melting point, but their nature and quantity should be insufficient to alter the essential character of the electrolyte as a sodium aluminium chloride electrolyte, wherein the M Al X_4 product is maintained.

It should be noted however, that when the separator is a beta-alumina or nasicon solid conductor of sodium ions and is not a micromolecular sieve, it is important that the anode material be sodium and it is desirable that the only alkali metal ions in the liquid electrolyte by sodium ions.

When the cell contains a micromolecular sieve this can be regarded as a conductor of sodium metal and/or sodium ions, depending on the mechanism whereby sodium is transported therethrough.

By 'micromolecular sieve' is meant a molecular sieve having interconnected cavities and/or channels in its interior and windows and/or pores in its surface leading to said cavities and channels, the windows, pores, cavities and/or channels having a size of not more than 50 Angstrom units and preferably less than 20 Angstrom units.

Suitable micromolecular sieves are mineral micromolecular sieves, ie inorganic lattice or framework structures such as tectosilicates, eg the zeolites 13X, 3A, 4A or the like, although certain essentially organic micromolecular sieves such as clathrates may, in certain circumstances, be suitable.

The active cathode substance should preferably be evenly dispersed throughout the matrix; and it may be in finely divided particulate form and/or it may adhere as fine particles or a thin layer to the matrix, preferably so that there are no large particles or thick layers of active cathode substance present, and preferably so that none of the active cathode substance is spaced physically from the material of the matrix, which acts as a current collector, by an excessive spacing, eg in large cavities in the matrix. In other words, the active cathode substance preferably should be close to or adherent to the material of the matrix, and should be as thinly spread as possible, consistent with the porosity of the matrix and the quantity of cathode substance required to be present. Large particles or thick layers of active cathode substance will not prevent the cell from working, but will merely be inefficient, a proportion of the active cathode substance remote from the cathode material amounting merely to dead weight.

In practice, after assembly of the cell in the form described above with its cathode in the discharged state, the cell will be heated to its operting temperature which will be in the region of 150°–500° C., typically 250°–300° C., and the cathode may be conditioned electrochemically, by subjecting it to the abovementioned charge/discharge cycles. Preferably the charging of a cell is at a low rate, typically in the region of 5 mAcm$^{-2}$ to a voltage limit of about 0.15 V above the equilibrium open circuit voltage of the cell. If the transition metal or metals in question are represented by M, the reaction upon charging can be represented as follow:

$$M + 2NaCl \rightarrow MCl_2 + 2Na$$

For example, the open circuit voltage for Fe/FeCl$_2$//Na is 2.35 V at 250° C.; and the open circuit voltage for Ni/NiCl$_2$//Na is 2.59 V at 250° C.

During the conditioning the cell is discharged, typically also at a low rate of about 15 mAcm$^{-2}$, each time to a voltage of about 0.5 V below the equilibrium open circuit voltage. Repeated cycling under these charging and discharging conditions is continued for as long as necessary until the cathode has been conditioned. This charging can be eg up to about 30 cycles but usually 1–3 cycles are found to be adequate. Conditioning results in a stable reversible capacity in excess of about 85% of the theoretical capacity based on the weight of NaCl added. The cell can then be operated, eg as a power storage cell, at much lighter current densities of the order of up to about 150 mAcm$^{-2}$ on discharge, and up to 50 mAcm$^{-2}$ upon charge.

Instead of conditioning at a fixed charging and discharging rate during each conditioning cycle, it is possible to gradually increase the current densities during the conditioning cycles, as the conditioning process progresses.

The invention extends further to an electrochemical cell of the type described above, ie an electrochemical cell which has a sodium anode which is molten at the operating temperature of the cell, a sodium aluminium halide molten salt electrolyte which is also molten at the operating temperature of the cell, a cathode whichis in the form of an electronically conductive electrolyte-permeable matrix impregnated with said molten said electrolyte, and between the anode and the electrolyte and separating said anode from said electrolyte, a separator selected from the group comprising solid conductors of sodium ions and micromolecular sieves which contain sodium sorbed therein, the molten salt electrolyte in the fully charged state of the cell comprising an equimolar mixture of sodium halide and aluminium halide, and the cathode being a cathode which has been made in accordance with the method of the present invention described above.

The invention will now be described, with reference to the following non-limiting illustrative examples, and with reference to the following drawings in which:

FIG. 1 is a plot of % mass or weight increase against time for a cathode being made in accordance with the method of the present invention;

FIG. 2 is a plot of cell voltage against discharge capacity for a cell employing a cathode made in accordance with the method of the present invention; and FIG. 3 is a plot of cell voltage against % theoretical capacity for a cell employing a cathode made in accordance with the method of the present invention.

EXAMPLE 1

A porous matrix was prepared by sintering iron powder mixed with NaCl. The starting mixture comprised 22.52 g of NaCl having a particle size of 53-125 microns homogeneously mixed with 25.82 g of iron powder having a particle size of 10-250 microns. This mixture was introduced into a furnace at 500° C. in air and was maintained at 500° C. while its mass was monitored. Its mass gain is shown in FIG. 1 which is a plot of % mass or weight increase against time. In this plot the mass gains theoretically equivalent to conversion of all the iron respectively of $Fe_3O_4$ and to $Fe_2O_3$ are shown, and it emerges that after about 6 hrs the sample has a mass gain equivalent to conversion of all the iron therein to $Fe_3O_4$. After 1 hour, the powder was found to have formed an artifact which was however to be too weak to handle, but after 2 hours it had formed a solid unitary body or artifact which gave a ringing sound when tapped. Heating in air was discontinued at the end of the period shown in FIG. 1 (about 21 hours) and the matrix was then substantially fully reduced by heating in $H_2$ at slightly less than 790° C. for ½ hour. The iron matrix product obtained containing NaCl powder dispersed therein was found to be suited for use as a cathode in accordance with the present invention.

Thus the matrix was impregnated (saturated by vacuum impregnation) with a molten salt electrolyte comprising $NaAlCl_4$ formed from an equimolar mix of NaCl and $AlCl_3$ and was loaded into a test cell wherein it was immersed in said $NaAlCl_4$ and coupled with a molten sodium anode by means of said $NaAlCl_4$, a beta"-alumina separator being provided between the $NaAlCl_4$ and the sodium. The cell was operated at 250° C. and was subjected to a plurality of charge/discharge cycles, using a charging current of 0.5 A (about 10 $mAcm^{-2}$ cathode area). FIG. 2 shows a plot of cell voltage against discharge capacity in Ah, for selected cell cycles (the 19th charge cycle during which it was charged at 0.5 A, the 19th discharge cycle during which it was discharged at 3A and the 26th discharge cycle during which it was discharged at 5A). FIG. 2 demonstrates that the method of the present invention can be used to provide a cathode having excellent operating characteristics in the cell in question.

EXAMPLE 2

A cathode was prepared according to the present invention by mixing together 27.23 g of nickel having a particle size of 5-50 microns with 17.8 g of the same type of NaCl as used in Example 1. This mixture was tapped into a porous mould and placed in a furnace at 500° C. where it was left for 4 days. A free-standing hard nickel oxide matrix was obtained which was then substantially fully reduced by heating to slightly less than 790° C. in a hydrogen atmosphere.

The matrix was saturated with liquid electrolyte and loaded into a cell in substantially the same fashion as described above for Example 1, except that the liquid electrolyte used comprised 2% m/m sulphur dispersed therein.

This cell was put through a number of charge/discharge cycles at 250° C., details of selected cycles being shown in FIG. 3 which is a plot of cell voltage against % theoretical capacity. In FIG. 3 details are shown of the 3rd charge cycle at 0.5A (10 $mAcm^{-2}$ cathode area) and of the 4th and 12th discharge cycles at 1A, the 15th discharge cycle at 3A, and the 35th and 48th discharge cycles at 5A.

Example 2 also demonstrates that the method of the present invention can be used to provide a cathode having excellent operating characteristics in the cell in question.

It is an advantage of the method of the present invention, when compared with making the cathode matrix in a single step by heating at an elevated temperature in a $H_2$ reducing atmosphere, that coarser, less reactive and less expensive starting materials can be used to form the matrix. For effective sintering in a single step in a reducing atmosphere a reactive starting material is required, which must thus have a reltively high surface area on a relatively small particle size and is hence more expensive. The coarse powders which can be employed by the present invention on the other hand do not readily sinter in a reducing atmosphere at temperatures as low as 790° C.

The present method in fact divides the matrix formation into two steps, namely the initial oxidation step which is in fact a matrix formation/fabrication step and readily provides a unitary cathode matrix in the form of a strong porous oxide body or artifact, and a reduction step providing a matrix of active cathode material in its discharged state, ready for impregnation with electrolyte and with NaCl if this is not provided in the starting powder.

The intergrowth of oxide layers from neighbouring particles during the oxidizing step, to provide oxide bridges between the particles leaves, after reduction, metal bridges. These bridges join together metal particles whose surface area and/or porosity are believed to be substantially increased by the oxidation/reduction cycle, leading to a desirably reactive matrix in the eventual cathode and good electronic conductivity via the bridges. The eventual cathode can thus perform at high rates at an early stage in a cell, and it is the high reactivity of the reduced metal which allows coarse, inexpensive starting materials to be used.

Easy matrix formation via the oxides in the oxidizing step allows moulds and/or compression of the powder during matrix formation to be dispensed with, and allows extremely finely divided solid NaCl to be mixed with coarse matrix material before heating. The Applicant has found, in contrast, that matrix metal/NaCl particulate mixtures using finely divided NaCl are extremely difficult to sinter directly in a reducing atmosphere, particularly at temperatures below 790° C. as the fine NaCl powder can coat the matrix metal particles and reduce the contact between them required for sintering, which problem is aggravated if the matrix metal particles are coarse.

It should be noted that an important and unexpected advantage of the method of the present invention, compared with direct sintering of the particulate starting material in a reducing atmosphere, is that virtually no shrinkage takes place upon matrix formation or subsequent reduction thereof. This permits, particularly for outside-cathode cell cathodes, matrix formation in situ on the associated current collector, eg in a cell casing or housing which forms a current collector for an outside-cathode cell. As mentioned above, during the oxidizing step, oxide forming on the matrix material particles in contact with the current collector/cell housing, can intergrow with oxide forming on said collector/housing, providing, after reduction, metal bridges connecting the matrix physically and electronically with the collector/housing. These bridges, together with the insignificant shrinkage of the matrix and the fact that during the oxidizing step the matrix in fact expands into a tight compressive fit within the cell housing in which it is formed, means that the cathode does not shrink away from the wall of the cell housing and good electronic contact is maintained. This shrinkage has proved to be a substantial problem when the Applicant has attempted to form cathode matrices in situ in cell housings by directly sintering the particulate starting material in a reducing atmosphere.

Finally, it should be noted that the transition metal used to form the matrix may contain minor proportions by mass of carbon, silicon, boron, nitrogen and phosphorous, which will not affect the invention.

We claim:

1. A method of making a cathode suitable for an electrochemical cell of the type comprising a sodium anode which is molten at the operating temperature of the cell, a sodium aluminium halide molten salt electrolyte which is also molten at the operating temperature of the cell, a cathode which is in the form of an electronically conductive electrolyte-permeable matrix impregnated with said molten salt electrolyte, and between the anode and the electrolyte and separating said anode from said electrolyte, a separator selected from the group comprising solid conductors of sodium ions and micromolecular sieves which contain sodium sorbed therein, the molten salt electrolyte in the fully charged state of the cell comprising an equimolar mixture of sodium halide and aluminium halide, the method comprising:

heating a particulate starting material comprising at least one member selected from the group of transition metals comprising Fe, Ni, Co, Cr and Mn in an oxidising atmosphere to cause its particles to become at least partially oxidized and to adhere together to form a unitary porous matrix;

heating the oxidized matrix in a reducing atmosphere at least partially to reduce the oxide formed during the formation of the matrix; and impregnating the reduced matrix with a sodium aluminium halide molten salt electrolyte, sodium chloride in dispersed form being incorporated into the matrix.

2. A method as claimed in claim 1, in which formation of the matrix and incorporation of the sodium chloride into the matrix take place simultaneously, the method including the step of dispersing particulate sodium chloride in the particulate starting material which is heated to form the matrix, before the matrix is formed by said heating in an oxidizing atmosphere.

3. A method as claimed in claim 2, in which the particulate starting material has particles which fall within the particle size range 10–100 microns, the particles of the sodium chloride being present in two particle size fractions, namely a size fraction forming 20–40% by mass of the sodium chloride which comprises particles in the particle size range 5–10 microns, and a fraction forming 60–80% by mass of the sodium chloride which comprises particles in the particle size range 50–250 microns.

4. A method as claimed in claim 1, in which the heating in an oxidizing atmosphere to form the matrix is in air and is to a temperature in the range 450°–550° C.

5. A method as claimed in claim 1, in which the heating in a reducing atmosphere is in hydrogen and is to a temperature in the range 750°–790° C.

6. A method as claimed in claim 1, in which the particulate starting material comprises at least one member selected from the group comprising Fe and Ni, the molten salt electrolyte being one in which the major molar proportion of the halide ions comprises chloride ions.

7. A method as claimed in claim 1, in which the heating of the particulate starting material to cause oxidation thereof takes place with said starting material in contact with a metallic current collector, the oxidation of said starting material to form the matrix and the subsequent reduction of the matrix causing the reduced matrix to adhere via a plurality of metallic bonds to the current collector.

8. A method as claimed in claim 1, in which impregnating the reduced matrix with the sodium aluminium halide molten salt electrolyte is by vacuum impregnation with said molten salt electrolyte in molten form.

* * * * *